Feb. 2, 1971    MANABU OHBA    3,560,028
PIPE JOINT DEVICE
Filed Dec. 30, 1968
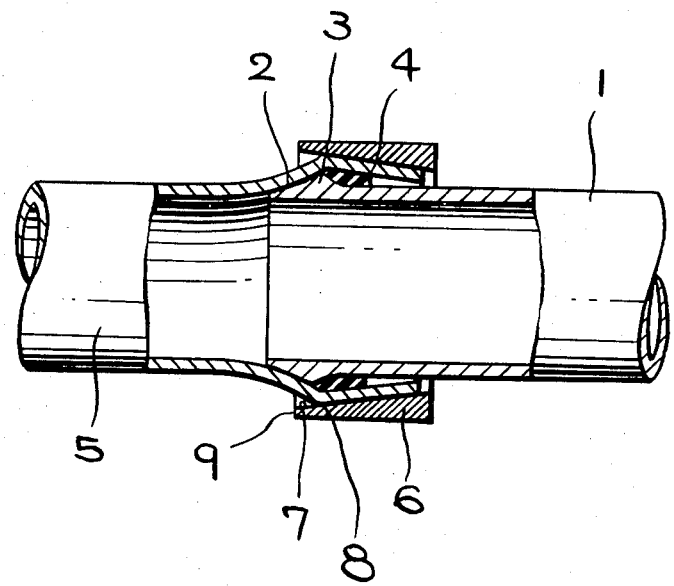
INVENTOR
MANABU OHBA
BY Stevens, Davis, Miller & Mosher
ATTORNEYS 3,560,028
PIPE JOINT DEVICE
Manabu Ohba, Aichi, Japan, assignor to Mitsui Petrochemical Industries, Ltd., Tokyo, Japan
Filed Dec. 30, 1968, Ser. No. 787,796
Claims priority, application Japan, Jan. 19, 1968, 43/3,262
Int. Cl. F16l 33/22
U.S. Cl. 285—255                        1 Claim

ABSTRACT OF THE DISCLOSURE

A pipe joint device comprising a first tubular member formed on one end portion with a protrusion, a second tubular member to be connected to said first tubular member, and an annular member formed on its inner circumferential surface with an inclined surface which is to be fitted over the outer circumferential surface of said second tubular member.

---

The present invention relates to pipe joint devices in general. In particular, the invention deals with a pipe joint device which permits to readily and positively connect two tubular members together.

Several pipe joint devices have been proposed for connecting two tubular members together, but none of them have been found satisfactory in structure and performance.

Accordingly, an object of the present invention is to provide a pipe joint device which is very simple in construction and yet permits to positively connect two tubular members together.

Additional objects and advantages of the invention will become apparent from consideration of the description set forth hereunder when considered in conjunction with the accompanying drawing which is a longitudinal sectional front view of the pipe joint device embodying the invention.

The objects of this invention are realized generally through the provision of a pipe joint wherein the ends of respective pipes which are to be joined telescopically fit one within the other and wherein an annular member is wedgingly slid over the outer telescoping end of one of said pipes to wedgingly clamp same to the inner telescoping pipe end, the outer pipe being of an elastically yielding material.

An embodiment of the invention will be explained with reference to the drawing. A tubular member 1 made of a hard material, such as metal, plastic, concrete or the like, is formed on the outer circumferential surface of an end portion thereof an annular protrusion 3 provided with an outer engaging surface 2 of mountain shape or semicircular shape. An end portion of a tubular member 5 made of plastic, rubber, cloth or like material that has a certain degree of elasticity is fitted over said engaging surface 2. An annular member 6 made of metal, plastic or like material and formed with an inclined inner circumferential surface 7 is fitted over a portion of said one end portion of said tubular member 5 which overlies the engaging portion 2 of the tubular member 1. Said annular member 6 is fitted over the end portion of the tubular member 5 in such a manner that its inclined inner circumferential surface is disposed so as to diverge in the direction of the tubular member 5, thereby intimately holding the end portion of the tubular member 5 between the inclined inner circumferential surface 7 of the annular member 6 and the engaging surface 2 of the tubular member 1.

In cases where a fluid to be handled is a gas of relatively high pressure or the tubular members to be connected together have a relatively large diameter and leakage is liable to occur, a resilient ring 4 made of planar rubber or the like may be mounted on the outer circumferential surface of the tubular member 1 at a position immediately behind the protrusion 3 to as to thereby ensure that a fluidtight seal is maintained between the two tubular members.

Preferably, a portion 8 on the inclined inner circumferential surface of the annular member 6 at which the annular member 6 bears against the tubular member 5 is spaced apart a suitable distance from the maximum diameter portion 9 on the inclined inner circumferential surface 7 of the annular member 6. The distance is determined by the materials, inner diameters and inner pressures of the tubular members.

If the portion 8 is disposed too near the maximum diameter portion 9, then portions of the tubular member 5 which are disposed adjacent the portion thereof at which the tubular member 5 is held between the tubular member 1 and the annular member 6 are liable to expand due to inner pressures of fluid in the tubular members, thereby causing the dislodgement of the annular member 6 and consequently of disengagement of the tubular members 1 and 5.

The pipe joint device according to this invention is constructed as aforementioned. In connecting the tubular member 5 made of plastic or like flexible material to the tubular member 1 of metal, plastic, concrete or like rigid material, the annular member 6 is mounted over the outer circumferential surface of the tubular member 1 beforehand and, when deemed necessary, the ring 4 is fitted over the outer circumferential surface of the tubular member 1 at a position disposed immediately behind the protrusion 3. Then, the end portion of the tubular member 5 is fitted over the end portion of the tubular member 1 formed with the protrusion 3, and the annular member 6 is moved to a position disposed over the end portion of the tubular member 5, so that the inclined surface 7 of the annular member 6 can be superimposed over the protrusion 3 of the tubular member 1 and the ring 4, when it is mounted, through the end portion of the tubular member 5 to provide a fluidtight seal therebetween.

When a fluid flows in a direction from the tubular member 1 to the tubular member 5, the pressure of fluid is applied to the end portion of the tubular member 5, whereby the annular member 6 is drawn toward the tubular member 5 by the tensile force exerted by the fluid to thereby press against the tubular member with an increased force. The ring 4 mounted when required is also pressed against the tubular member 1. Thus, there is provided a perfect fluidtight seal between the tubular members, and no leakage occurs or the tubular members never become inadvertently disconnected during use.

When it is desired to disconnect the tubular members from each other, the annular member 6 is moved nearer the other end of the tubular member 1 to thereby disengage the inclined inner circumferential surface of the annular member 6 from the portrusion 3 of the tubular member 1. With this operation, the two tubular members can readily be disconnected from each other.

Thus, the joint device embodying this invention permits to connect and disconnect tubular members readily and positively, facilitating work on the site. For example, by connecting the tubular member 1 to the elbow of a main line of irrigation waterwork in the paddyfield or forming the tubular member 1 integrally with the elbow, it is possible to readily form a large number of water distribution branch lines. This pipe joint device is more simple in structure and easier to operate than the conventional device of threadably connecting lines together. Moreover, the pipe joint according to this invention has a long service life and is useful in various applications.

What I claim is:
1. A pipe joint comprising a first tubular member having an outer circumferential protrusion at one end portion thereof, a second tubular member having a second end portion telescopically fitted over said one end portion and circumscribing said protrusion, said second tubular member when telescoped over said one portion having a wall portion of decreasing diameter in abutting engagement with the portion of said protrusion closest to said one end, and seal means positioned on said first tubular member adjacent the portion of the protrusion farthest from said one end, and an annular member having a smooth unthreaded inner circumferential surface continuously inclined, in the direction extending axially away from said second tubular member whereby the largest diameter of said inclined surface faces said second member, said largest diameter being greater than the largest diameter of said second end portion to an extent whereby an axial extent of said inclined surface axially overlaps said second portion with a radial space existing therebetween, said inclined surface contacting said second portion commencing at a point axially spaced from said largest diameter at which point the diameter of said inclined surface is smaller than said largest diameter, said first tubular member having a constant outer diameter extending at least from said portrusion to a point beyond the terminal end of the smallest diameter portion of said annular member, and the terminal end of said second tubular member terminating short of the smallest diameter portion of said annular member, said annular member being freely axially slidable along the longitudinal extent of said first member and over said second end portion of said second member to an extent whereby said inner circumferential surface wedgingly crimps said second end portion radially against said protrusion, whereby said inclined surface provides a wedging effect together with said protrusion against said second portion pursuant to any tendency of said first and second tubular members to axially move in opposite directions relative to each other.

References Cited

UNITED STATES PATENTS

| 2,453,997 | 11/1948 | MacWilliam | 285—256 |
| 3,032,358 | 5/1962 | Rolston | 285—247 |

FOREIGN PATENTS

| 156,470 | 5/1954 | Australia | 285—255 |
| 280,448 | 9/1965 | Australia | 285—242 |
| 546,525 | 8/1922 | France | 285—247 |
| 1,152,473 | 9/1957 | France | 285—242 |
| 387,011 | 1/1933 | Great Britain | 285—255 |

DAVE W. AROLA, Primary Examiner

U.S. Cl. X.R.

285—332.2